United States Patent [19]

Mikina

[11] 4,344,333
[45] Aug. 17, 1982

[54] VARIABLE SPEED TRANSMISSION

[76] Inventor: Stanley J. Mikina, 4782 Coquina Key Dr. SE., St. Petersburg, Fla. 33705

[21] Appl. No.: 163,339

[22] Filed: Jun. 26, 1980

Related U.S. Application Data

[63] Continuation of Ser. No. 956,084, Oct. 30, 1978, abandoned.

[51] Int. Cl.³ .................. F16H 15/08; F16H 15/00; F16H 13/10
[52] U.S. Cl. .................. 74/199; 74/190.5; 74/208; 74/209; 74/212; 74/213
[58] Field of Search .......... 74/190, 190.5, 199, 74/207, 208, 209, 213, 212

[56] References Cited

U.S. PATENT DOCUMENTS

| | | | |
|---|---|---|---|
| 877,491 | 1/1908 | Dill | 74/199 |
| 929,405 | 7/1909 | Dill | 74/199 |
| 1,017,877 | 2/1912 | Landis | 74/199 |
| 1,017,893 | 2/1912 | Landis | 74/199 |
| 1,139,393 | 5/1915 | Woodland | 74/199 |
| 2,222,281 | 11/1940 | Beier | 74/190.5 |
| 2,563,895 | 8/1951 | Wildhaber | 74/208 |
| 2,563,896 | 8/1951 | Wildhaber | 74/199 |
| 2,591,753 | 4/1952 | Wildhaber | 74/199 |
| 2,593,510 | 4/1952 | Wildhaber | 74/208 |
| 2,772,575 | 12/1956 | Gilbert | 74/199 |
| 2,880,623 | 4/1959 | Beier | 74/190.5 |
| 2,958,229 | 11/1960 | Sorkin | 74/199 |
| 3,871,239 | 3/1975 | Steinhagen | 74/199 |

FOREIGN PATENT DOCUMENTS

| | | | |
|---|---|---|---|
| 739658 | 1/1933 | France | 74/199 |
| 943016 | 2/1949 | France | 74/199 |
| 1346385 | 11/1963 | France | 74/199 |

*Primary Examiner*—Leslie Braun
*Attorney, Agent, or Firm*—William J. Ruano

[57] ABSTRACT

An infinitely variable or stepless mechanical speed changing mechanism for transforming a rotary output shaft speed of lower or higher speed than the input speed and respectively higher or lower output torque than the driving input torque. Interleaved stacks of relatively thin flexible laminates are keyed to the respective shafts with some freedom of interleaving accomodation and developing the required tangential tractive effort in the planes of the laminations by means of substantially dry non-viscous Coulomb friction forces due to the loading forces applied normal to the planes of the laminations on the stack ends in a direction to pinch together the interleaved laminations, and with said normal loading forces applied to the outer laminations in either input or output stacks, or in both, by means of loading ball-bearing like wheels whose convex outer surfaces roll with substantially no slip on said outer laminations.

7 Claims, 8 Drawing Figures

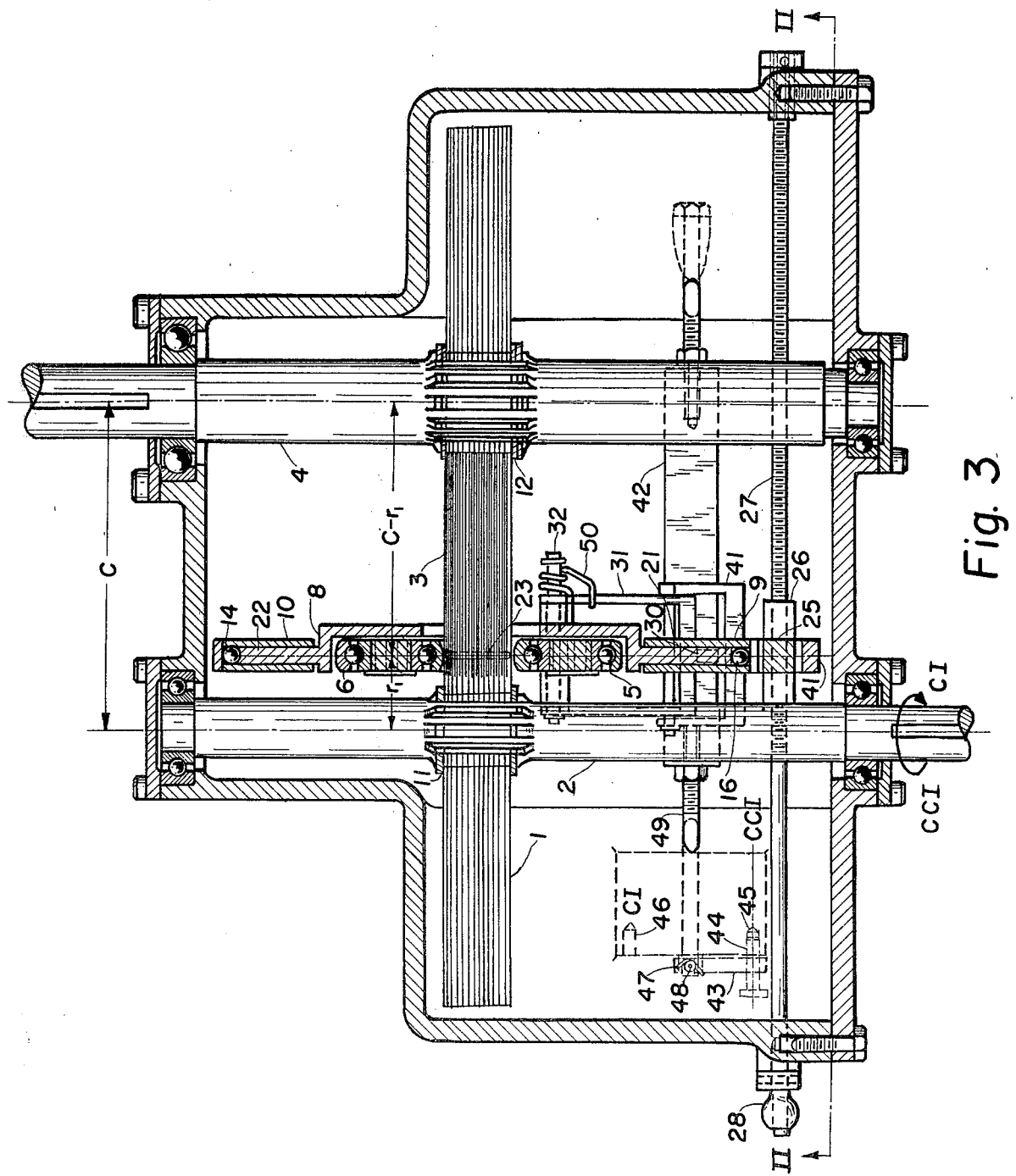

VARIABLE SPEED TRANSMISSION

My invention relates to an infinitely variable or stepless mechanical speed changing mechanisms for transforming a rotary shaft speed input into a rotary output shaft speed of lower or higher speed than the input speed and respectively higher or lower output torque than the driving input torque.

It is an object of my invention to effect this rotary power transmission from the input driving shaft to the output driven shaft by means of forces of dry or Coulomb type surface-to-surface friction developed between torque transmitting elements that are passed into intimate contact with each other by means of other applied forces that act substantially normal to the power transmitting friction surfaces.

A further object of my invention is to provide a comparatively large number of substantially flat friction surfaces, on both the driving and driven shafts, which, acting in unison, are thus capable of transmitting comparatively large torques and horsepower even with the reduced coefficients of friction obtained with polished metal to metal contacts. This plurality of friction surfaces is pressed together by means of a single applied normal force and its equal and opposite colinear reaction. This force is transmitted in series through the stacks of contiguous friction members of the assembly and causes the resulting torque transmitting friction forces to act additively, in tandem, to produce the desired output speed and torque.

Another object of my invention is to provide a power transmission of high mechanical efficiency and minimum wear of the engaging friction surfaces by greatly reducing the sliding friction within the active frictionally coupled assembly.

And finally, still another, and very important, object of my invention is to provide the combination of the aforesaid transmission with an indispensable and novel means for accurate adjustment and setting of the output speed and for providing a rapid and stable response to speed changer commands. The net effect of this novel combination of machine elements is to cause the output speed to follow the speed changer commands with an ideal mathematical, damped exponential response of short time constant and with no oscillatory overshooting of the desired output speed.

These and other objects of my invention are achieved as described in detail in the following description taken with the accompanying drawings wherein FIGS. 1, 2 and 3 show an approximately half-size embodiment of my transmission that is capable of transmitting about 50 hp with an input speed of 1800 rpm and an output speed range of 14.5 to 1, consisting of a speed step down of 4.33 to 1 and a speed step up to 1 to 3.36. The output speed in this example can thus be varied continuously from a low of 416 rpm to a high of 6048 rpm. If this particular transmission size were to be used, for example, to drive an electrically powered automobile, the car could be driven by a substantially constant speed motor for maximum efficiency and the car speed could be varied continuously between the limits of 3½ mph and 50 mph with a calculated mechanical efficiency of about 98% for maximum distance range from the car battery power.

FIG. 3 is a view of Section III—III looking from the top into the horizontal plane passing through the input and output shaft centerlines, through the transmission friction members, through the friction surface loading and control members, and through the transmission housing.

FIGS. 4 (a) and 4 (b) are graphs showing characteristics of the invention, and

Figure 5:
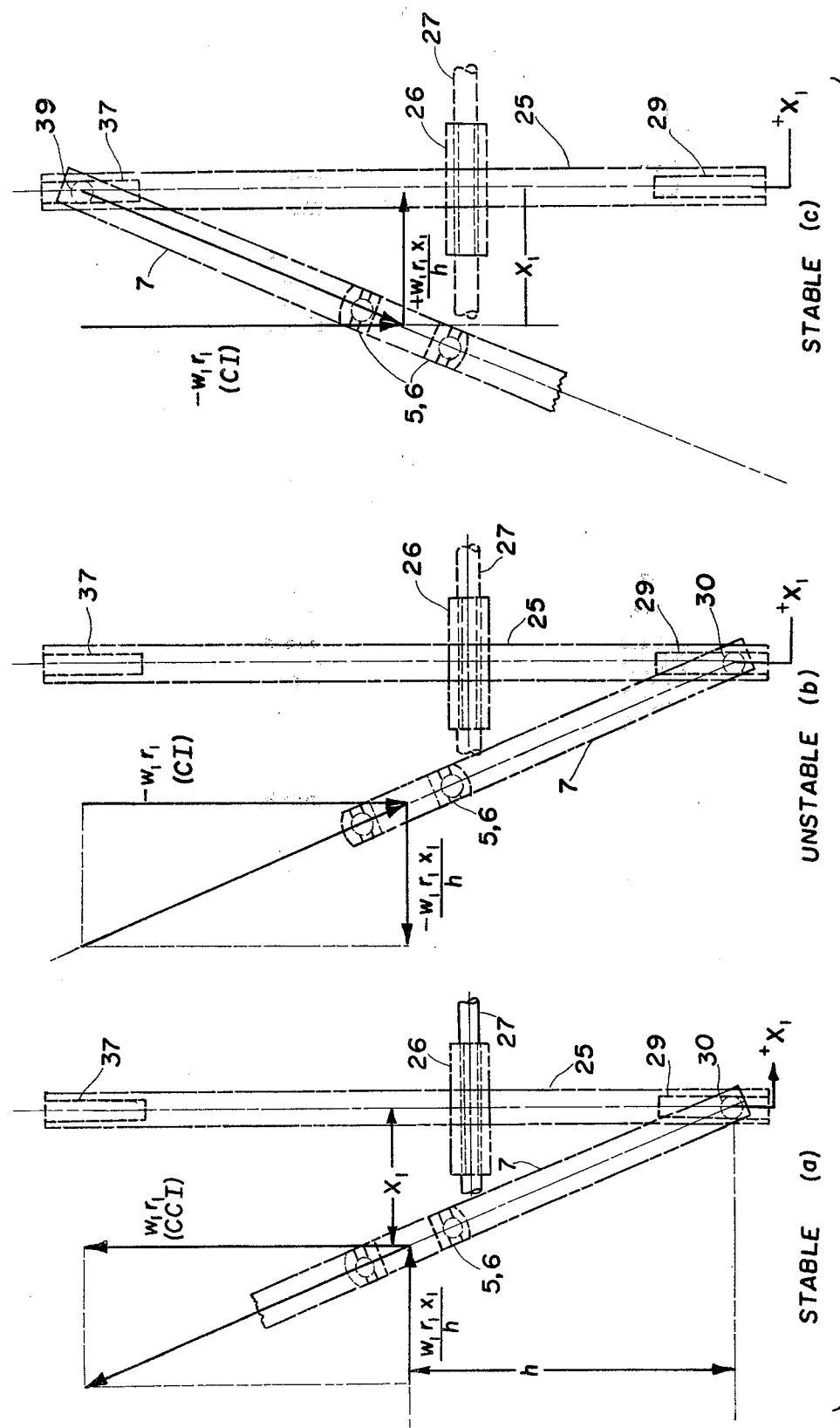

FIGS. 5 (a) (b) and (c) are vector velocity diagrams illustrating certain characteristics.

A stack of thin hardened spring steel discs 1 is mounted on input shaft 2 and is keyed to it by splines on the shaft on which the discs are a close fit but are free to slide axially on shaft 2 within the small clearance limits imposed by the snap rings 11 that hold stack 1 in place on shaft 2.

Interleaved with discs 1 is another stack of discs 3 that are mounted on output shaft 4 and are keyed to it by splines on the shaft on which the discs are a close fit but are free to slide axially on shaft 4 within the small axial clearance limits imposed by the snap rings 12 that hold stack 3 in place on shaft 4. The total axial stack clearance established on each shaft by snap rings 11 and 12 is just large enough to allow the interleaving of discs 1 and 3 without any appreciable frictional binding and with only a small clearance between the mating input and output discs.

The initially comparatively loosely interleaved disc assemblies are pressed into axial contact with each other by means of coaxial forces applied to the disc stacks by means of loading wheels 5 and 6 which are mounted on swivelable supports 7 and 8 within loading arms 9 and 10.

Loading wheels 5 and 6 are in the form of hardened steel ball-bearings, and the outer surface of their outer races is ground also to a convex curvature in planes passing through the loading wheel axis.

The purpose of the convex wheel surface is to limit the area of contact between the wheels and engaged discs far greater transmission efficiency as well as to reduce swiveling torques on frames 7 and 8 for the speed changing operation.

Figure 1:
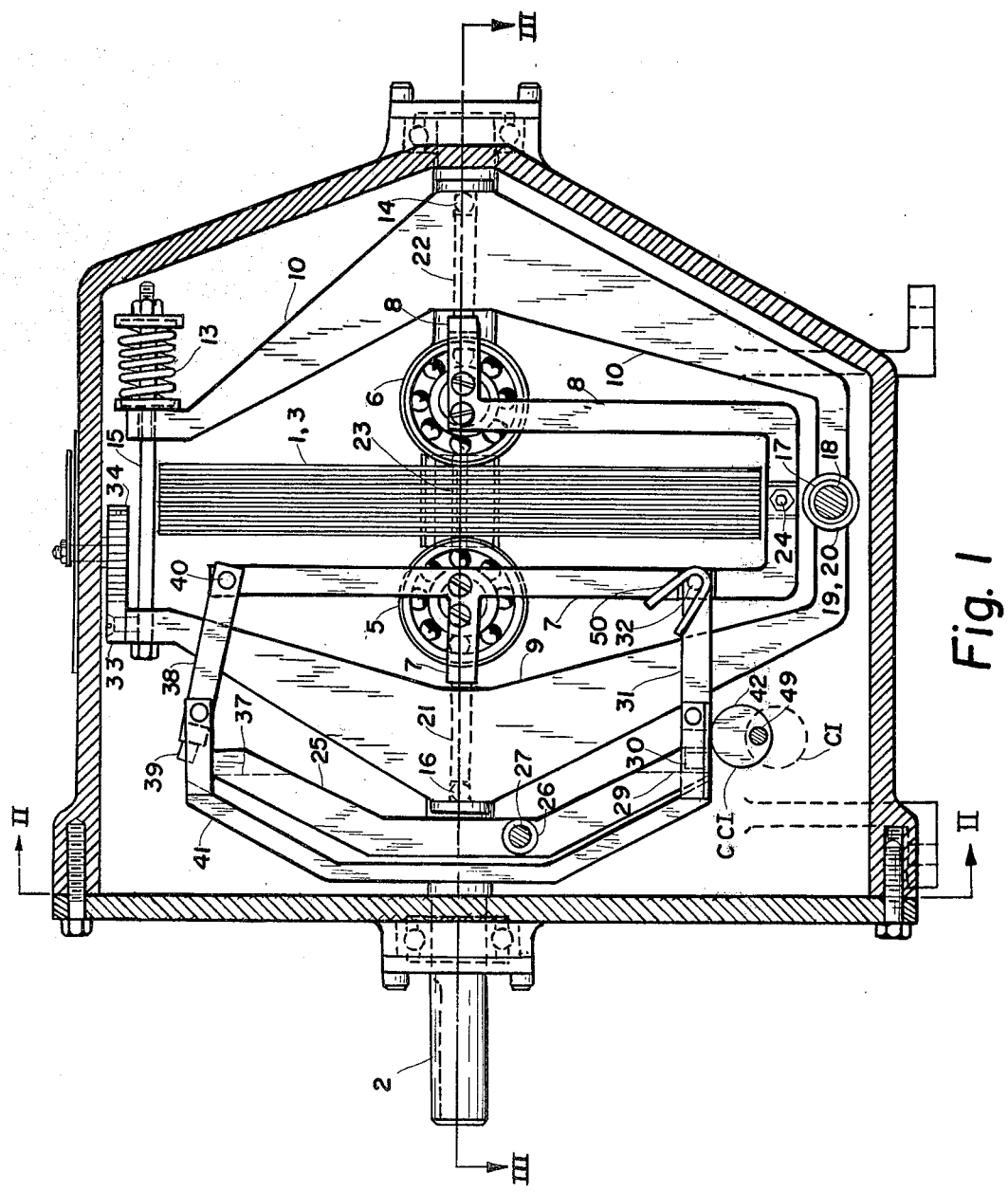
FIG. 1 shows the transmission mechanism as viewed in Section I—I of FIG. 2.

Loading arms 9 and 10, as best seen in FIG. 1, are biased by a helical compression spring 13 that acts directly on the upper end of arm 10 to apply the levered up spring force to swivable support 8 through a thrust ball 14 on swivel shaft 22, while an equal and opposite colinear spring reaction force is transmitted to arm 9 through bolt 15 and then its levered up effect is applied to swivable support 7 through a thrust ball 16 acting on swivel shaft 21.

Loading arms 9 and 10 are pivoted at their lower ends on a one piece bushing 17 that is free to slide axially on and is guided by a rod 18 that is parallel to the normal line between the shaft centerlines of 2 and 4. The reaction forces of the loads on arms 9 and 10 are transmitted to guide bushing 17 by means of encircling bearings 19 and 20 that are joined to their respective loading arms at their lower ends. In this way, the equal and opposite colinear reaction forces from arms 9 and 10 are applied to and are in equilibrium with guide bushing 17, which is thus free to slide axially on rod 18 with negligible frictional impedance. This sliding freedom is very important and essential to the mechanics of the speed changing operation.

The swivel shafts 21 and 22 of supports 7 and 8 are coaxial to each other and parallel to the transmission main drive shafts 2 and 4. The axes of 21 and 22 also intersect the normal line joining the centers of shafts 2 and 4. During steady state transmission of power loading wheels 5 and 6 are so oriented that their outer convex surfaces at the points of contact with the disc laminations move with and have the same linear surface velocity as the outer disc laminations at these points of contact.

The forces of loading wheels 5 and 6 act normal to the disc laminations and are transmitted through the interleaved lamination stacks along the axis of coaxial swivel shafts 21 and 22. When torque and rotation are applied to input shaft 2, the normal forces of wheels 5 and 6 cause torque and rotation to be transmitted from disc stack 1 to disc stack 3 and shaft 4 by means of friction forces in the lamination planes and tangent to the disc circumferences at the points of disc contact.

In order for high transmission efficiency to be achieved, it is necessary that the individual disc laminations be comparatively thin and flexible. This will reduce the interlamination contact pressures at the points where the laminations still touch but move at different velocities at the contact points and areas. A lamination thickness of the order of 0.010" to 0.020" will provide enough bending flexibility to limit the ellipsoid of surface pressures in the stack interior to a fairly narrow and sharply defined shape 23 similar to a prolate ellipsoid of revolution, as shown by the dotted outline of the ellipsoid in FIGS. 1 and 3 along the axis of the loading wheel stack squeezing forces. In the limit of paper thin laminations the prolate ellipsoid would shrink to a line colinear with the line of action of the loading wheel forces.

Some preliminary test results indicate that a transmission mechanical efficiency of about 97% can be realized with a lamination thickness of the order of 0.015". With this thickness and assuming a conservative value of 0.05 for the coefficient of interlaminar surface friction, it is estimated that disc stacks 10 inches in diameter, for example, and consisting of 21 laminations for the input and 20 liminations for the output are sufficient to transmit 50 hp at 1800 rpm input, with an output speed range of 14.5 to 1. The 21 input laminations will permit the pressure wheels 5 and 6 to contact only the input laminations at each end of its stack, which may be desirable, while the interleaved 20 output laminations with a friction surface on each side of each limination will have a total of 40 friction surfaces for power transmission. The total stack height of the interleaved squeezed down laminations is thus $41 \times 0.015" = 0.615$ in. in this example. At points away from the line of action of loading wheels 5 and 6, the stack height will be slightly greater as the flexible laminations bend to provide interleaf clearance for minimum sliding interference between the laminations and thus for maximum mechanical efficiency.

A vital part of my invention is the novel means for changing the output speed relative to the input speed. The magnitude of the technical problem the speed changing operation poses can be better appreciated when one considers that the lamination stacks are squeezed together by loading wheels 5 and 6 with a force of the order of 600 lbs in the 50 hp transmission previously described. In order to vary the transmission output speed, the position of the loading wheel assembly must be varied along the normal line passing through the centers of shafts 2 and 4. If the variable distance from the point of contact of wheels 5 and 6 with the disc laminations to the certerline of shaft 2 is r, and if the fixed distance between said shaft centers is C, the ratio of the output speed $w_2$ relative to the input speed $w_1$, is $$w_2/w_1 = r_1/(c-r_1)$$

In view of the high squeeze forces on the disc stacks, it is obviously not practical to change the speed ratio by using brute force to displace the loading wheel assembly 5, 6, 7, 8, 9, 10 in a direction to change the distance $r_1$. Such a forcible displacement would cause loading wheel and disc wear and flat spots on the wheels because of the large sliding and abrading forces at the wheel-disc contacts. Also, in view of the thinness of the laminations a displacement to reduce $r_1$ from its maximum radius could cause buckling the warping of the outer disc laminations in stack 1.

My novel speed changing mechanism is indispensable to the successful functioning of the transmission by eliminating the disadvantages of brute force control and using instead a low force actuating method for varying $r_1$ without causing any abrasive sliding at the wheel-disc contact surfaces. With my method, these contact surfaces operate with almost 100% pure rolling osculation, and the distance $r_1$ is caused to go to its commanded position like an exponentially damped follower of short time constant and no oscillatory overshooting of its final position.

This is accomplished by simultaneously swiveling wheel frames 7 and 8 about their swivel axes 21 and 22 to cause the angled loading wheels 5 and 6 to roll along the spinning discs in a direction to vary the distance $r_1$. To insure equal and simultaneous swiveling, the lower extensions of frames 7 and 8 are joined by a pivot bolt 24, as shown in FIGS. 1 and 2, that allows wheels 5 and 6 to load the disc stacks without restraint, but is accurately tightened with a self-locking nut for low axial clearance to make frames 7 and 8 move together in the angular swiveling displacement.

To allow frames 7, 9 and 8, 10 to move without restraint in the disc loading direction even though the pivot axes of bolt 24 and rod 18 are not at the same center, a small radial clearance must be provided between bolt 24 and its mating holes in 7 and 8. This can be quite small. For example, if we specify that wheels 5 and 6 be capable of a total displacement toward each other of ⅛ inch to take care of accumulated tolerances and to facilitate assembly, then the total diametral clearance around bolt 24 to allow the ⅛" travel is only 0.016". This can be divided into a diametral clearance of 0.008" at each bolt hole in arms 7 and 8. Alternatively, a forked type slip joint can be provided in place of bolt 24 that will allow even greater slip displacements at that location.

The angular displacement of loading wheel frames 7 and 8 is effected by means of a bar 25 having a threaded hub 26 mounted on a long threaded rod 27 whose rotation by an external crank 28 causes a displacement of bar 25 along the threaded rod. Rod 27 is parallel to the lines defining $r_1$ and C between the main shaft center. Control bar 25 has a slotted end 29 that engages a pin 30 projecting from U frame 31 that is pivoted on pin 32 engaging frame 7.

Figure 2:
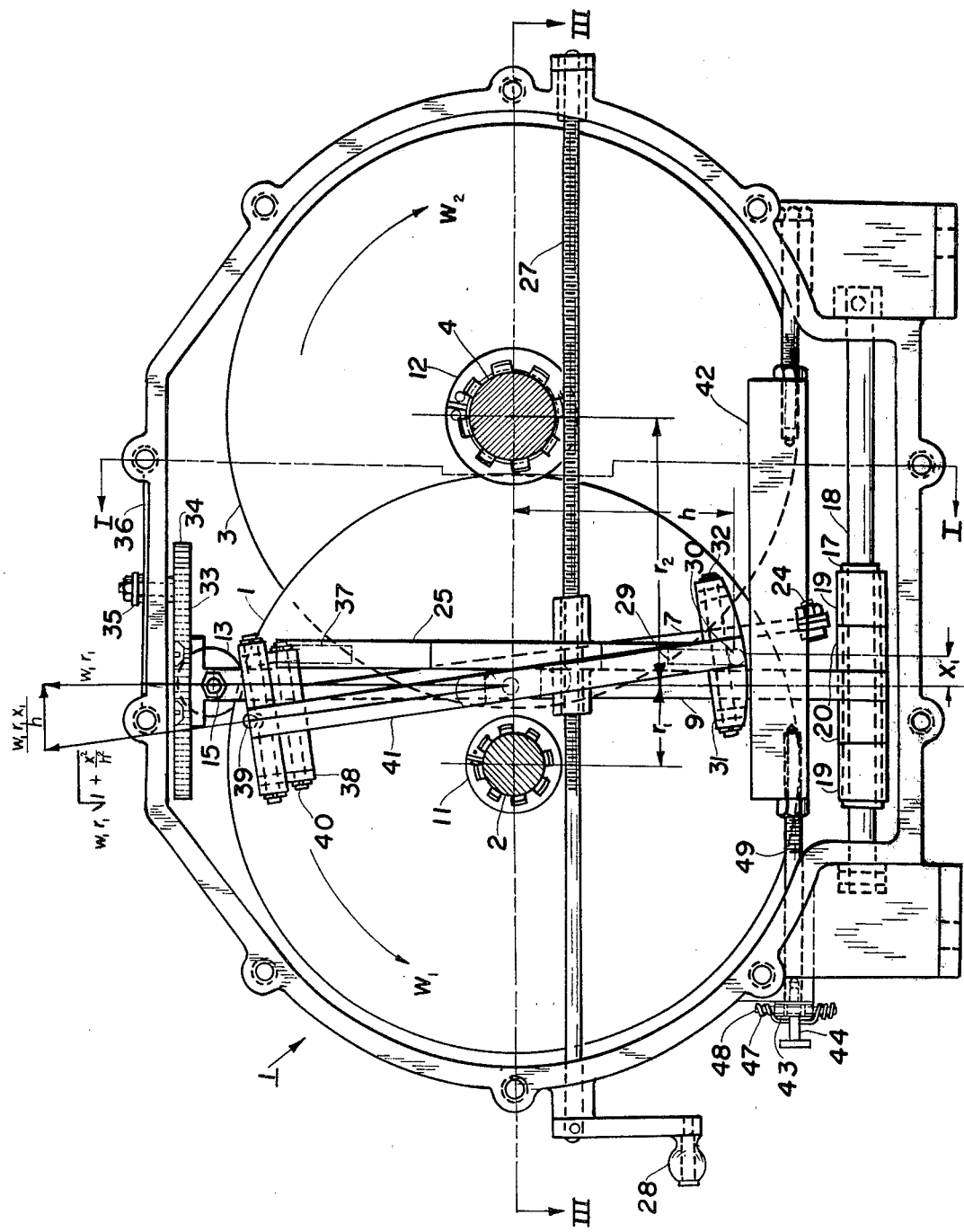
FIG. 2 is a view looking into the transmission from the input shaft end with the housing cover plate removed, as indicated by the Section II—II boundary lines.

As bar 25 is displaced on screw 27 to the right from some initial equilibrium position, the accompanying displacement of slot-engaged pin 30 causes the loading wheel swivel assembly to be angularly displaced out of the plane of FIG. 1 and as shown in FIG. 2. The surface or linear velocity of wheels 5 and 6 at the points of contact with the spinning discs is equal to $w_1 r_1$. When pin 30 is suddenly displaced along screw 27 a distance $X_1$, as indicated at the bottom of FIG. 2, wheels 5 and 6 suddenly increase in linear velocity of $w_1 r_1 \sqrt{1 + X^2/h^2}$, as shown by the vector diagram of velocities in FIG. 2. In this relation $X_1/h$ represents the tangent of the angle of swivel, since h is the vertical distance between the swivel axes 21, 22 and the axis of pin 30 where it engages the slotted end 29 of bar 25. The closing vector to the right between $w_1 r_1 \sqrt{1 + X_1^2/h^2}$ and $w_1 r_1$ is a translational velocity $w_1 r_1 X_1/h$ of the wheel frames 7, 8 in the same direction $X_1$ that caused loading wheel frame swiveling. Thus the wheel frame and loading arm assembly 5,6,7,8,9,10,13,14,15 is caused to follow the initial suddenly applied command displacement $X_1$ of bar 25. The aforesaid moving assembly is guided in its path by bushing 17 as it slides on rod 18 and on which loading arms 9 and 10 are pivoted on bearing sleeves 19 and 20 surrounding bushing 17.

The necessity for isolating guide rod 18 from the reaction forces as internal reactions without an external component, is now made more evident. Without bushing 17, the frictional drag between rod 18 and bearing sleeves 19 and 20 would be too large to allow the surface friction forces of wheels 5 and 6 to displace the wheel support assembly for output speed changing.

If control bar 25 stops suddenly at the end of its displacement $X_1$, the follower assembly 5,6,7,8,9,10,13,14,15 moves a distance X to catch up with $X_1$. As it does so, the continued displacement of frames 7 and 8 and their loading wheel assemblies causes the initial swivel angle arctan $(w_1 r_1 X_1/h)$ to be continuously reduced to $w_1 r_1 (X_1 - X)/h$. The differential equation governing this follower motion X is $$\frac{dX}{dt} = \frac{w_1 r_1}{h} (X_1 - X) \quad (1)$$

subject to the initial conditions that at $t=0$, $X=0$ and $$\frac{dX}{dt} = \frac{w_1 r_1 X_1}{h}.$$

The solution of (1) is $$X = X_1 \left(1 - e \exp\left(-\frac{w_1 r_1 t}{h}\right)\right). \quad (2)$$

As $t \to \infty$, $X \to X_1$, and $dX/dt \to 0$. The letter e in equation (2) is the base of the natural logarithms 2.7183. Equation (2) thus represents the mathematical characteristics of the dynamic process whereby the response displacement X follows the command displacement $X_1$ for a suddenly applied $X_1$. The response is seen to be of a damped exponential character with a response time constant $$T = h/(w_1 r_1) \quad (3)$$

Figures 4A, 4B:
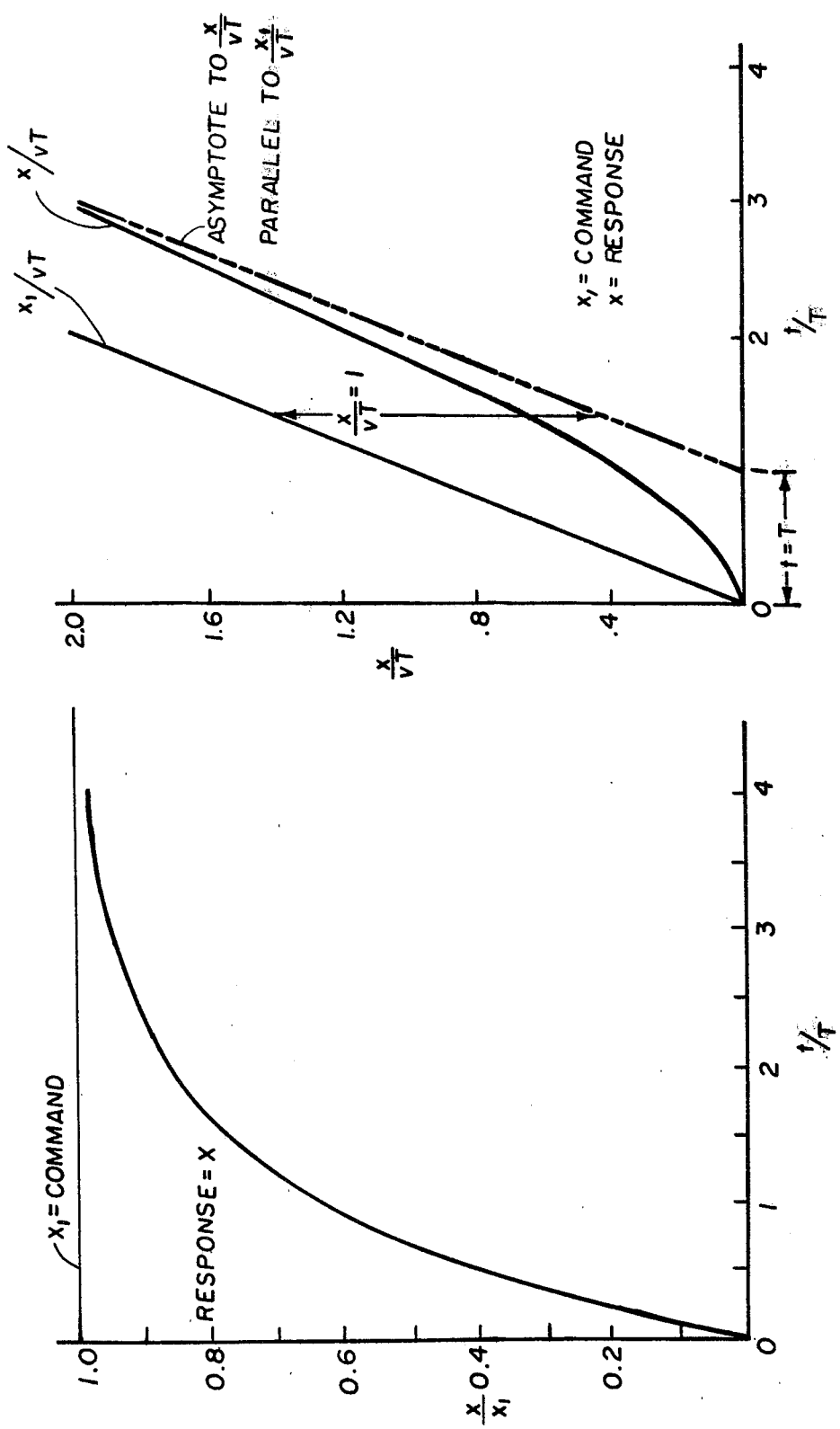

The meaning of this time constant can be illustrated as in FIG. 4(a), which is a non-dimensional plot of the ordinate X as a function of t along the abscissa. The value of X at $t = T = h/(w_1 r_1)$ is equal to $X_1(1 - e^{-1}) = 0.6321 X_1$. The follower displacement X is seen to attain 63% of the value of $X_1$ in the time T. This time constant can be quite short in this transmission design. For example, in the 50 hp unit described previously, at the lower output speed end of the range, $r_1 \cong 1\frac{1}{8}''$, $w_1 = 30 \times 2\pi$ radions/sec (1800 rpm), and h-$3\frac{7}{8}''$, giving a $$T = \frac{3.875}{30 \times 2\pi} \times 1.125 = .0183 \text{ second} \quad (4)$$

This is a typical very rapid response that extends the range of usefulness of my transmission to all applications where quick changes in speed ratio may be required, as in constant speed drives for aircraft or other A.C. generators powered by variable speed prime movers, or for electric car propulsion from a constant speed electric motor. At the high speed end of the speed range, where $r_1$ increases to $4\frac{3}{4}$ in., the response time constant is further reduced $$T = \frac{3.875}{30 \times 2\pi} \times 4.75 = .0043 \text{ second} \quad (5)$$

In spite of this very rapid response, the position X of the loading wheel assembly is perfectly stably controlled at all times, being exponentially damped and without any overshoots or oscillations. While it appears that in theory X never catches up with $X_1$ since that occurs asymptotically only as the time t approaches infinity ($t \to \infty$), practially this is not important since the small control system friction which was neglected in the mathematical analysis will eventually bring the system to a dead stop with $X = X_1 - \delta$, where $\delta$ is a very small displacement of the order of mils.

A further insight into the dynamic characteristics of this control system is obtained by studying its response to the case of control bar 25 moving on screw 27 with a constant translational velocity v. The differential equation of the resulting X motion is $$\frac{dX}{dt} = \frac{w_1 r_1}{h} (vt - X_1). \quad (6)$$

Its solution, subject to the initial conditions $X=0$, $dx/dt=0$ at $t=0$ is $$X = vt - vT(1 - e^{-t/T}) \quad (7)$$

The non-dimensional plot of X and $X_1$ as a function of t is shown in FIG. 4(b). For all practical purposes and for the short time constants involved, X and $X_1$ move in unison as the loading wheel assembly follows the command signal $X_1$. For times t long compared to the time constant T, there is a constant positional errror between commander and follower equal to $$\Delta X = vT \quad (8)$$

This is negligibly small for all practical values of v.

In applications requiring fairly rapid changes in output speed, as in the case of an electric car driven by a shunt type substantially constant speed motor, the speed changer screw 27 can be replaced by a push rod attached to bar 25 and actuated by a flexible shaft or other type of linkage from a speed control pedal for the car driver. The push rod can be guided by bushings at each side of the transmission housing.

The application of the transmission to the acceleration of inertia loads, as in the case of an electric automobile being brought up to speed, requires more detailed examination with respect to the slip torque limits of the transmission. If the inertial load at the output shaft 4 due to load acceleration requires a higher interlaminar friction torque than the disc stacks can provide, then slippage will occur between the driving and driven discs 10 and the transmitted torque is then limited by the relatively low coefficient of sliding friction at the disc contact surfaces. To avoid these overloads and the possible wear and damage of the disc laminations, it is desirable to limit the acceleration caused by too rapid speed ratio changes. In my transmission this limiting can be readily done by limiting the maximum allowable angular displacement of the loading wheel assembly 7,8. If $$w_2 = \frac{r_1}{c - r_1} w_1 \tag{9}$$

then the angular acceleration of the output shaft is given by differentiating equation (9) with respect to t:

$$a = \frac{dw_2}{dt} = \frac{dr_1}{dt} w_1 \left[ \frac{1}{c - r_1} + \frac{r_1}{(c - r_1)^2} \right] \tag{10}$$

The quantity $dr_1/dt$ is precisely the quantity $dX/dt$ of equation (1), and its maximum value is $$\left( \frac{dr_1}{dt} \right) \max = \frac{w_1}{h} [r_1(X_1 - X)] \max. \tag{11}$$

Hence to limit the acceleration a in equation (10), it is only necessary to limit the maximum error between command and follower displacements $|X_1 - X|$. In this case, this is done by limiting the clearance gap between U frame 31 and loading arm 9 to limit the maximum swivel angle of the loading wheels during the acceleration interval when the loading wheel assembly is following the command displacement $X_1$.

Restating these mathematical relations in words, the sequence of logic here is expressed as follows:
  (a) If output velocity is proportional to position $r_1$ then
  (b) Output acceleration is proportional to position velocity $dr_1/dt$
  (c) To limit output acceleration, limit $dr_1/dt$
  (d) To limit $dr_1/dt$, limit maximum angle of swivel of loading wheels 5 and 6.
  (e) To limit maximum angle of swivel, limit the clearance gap between U frame 31 and loading arm 9 located between the two legs of the U.

In some applications, it may be desirable to indicate the output speed setting of the transmission. One way of doing this is by suitable gearing from the rotating screw 27 and crank 28 to a pointer on a speed scale. However, because of the large number of revolutions of screw 27 over the speed range, a more direct method of speed indication is preferable. This is shown in FIGS. 1 and 2. A gear rack 33 is attached rigidly to the upper end of loading arm 9 and engages a gear pinion 34 that drives the speed indicating pointer 35 over the face of speed scale 36. The pinion pitch diameter can be chosen to swing the indicator pointer over nearly 360° as the rack is displaced by the displacement of arm 9 over the range of minimum to maximum $r_1$.

An examination of the diagram of vector velocities shown superposed on FIG. 2 reveals that when the direction of the input angular velocity $w_1$ is reversed from counterclockwise to clockwise, looking into the input shaft end, then all of the velocity vectors in the diagram are reversed in direction. Particularly significant is the fact that the reversal of the closing velocity vector $(w_1 r_1 X_1)/h$ causes the speed control system to become unstable in the configuration previously described. The motion X of the loading wheel assembly to the left for a command displacement $X_1$ of bar 25 to the right will be in a direction to increase the swivel angle and to move the loading wheel assembly faster and faster away from $X_1$ in the opposite direction from $X_1$.

To prevent such run away control instability and to make the transmission functional for both directions of input shaft rotation, it is necessary to provide means for reversing the swivel angle from its direction for counterclockwise shaft input. This is done by causing the upper end of frame 7 to be brought into engagement with a slot 37 in the upper end of control bar 25 by means of a U frame 38 and its slot engaging pin 39. U frame 38 is pivoted at the upper end of frame 7 by means of a pin 40. While pin 39 is engaged in slot 37, pin 30 must be simultaneously disengaged from slot 29 at the lower end of the speed control assembly. These simultaneous displacements are effected by tieing U frames 31 and 38 together by a link member 41 that is positioned right next to bar 25 and is substantially parallel to it.

The required simultaneous displacements of U frames 31 and 38 are then obtained by means of an eccentric cam shaft 42 that is in contact with U frame 31 and is rotated half a revolution to disengage pin 30 and engage pin 39 relative to their respective slots 29 and 37 in bar 25. The proper position for eccentric cam 42 for each direction of input shaft rotation can be selected manually by means of a crank arm 43 that is maintained in the selected position by means of an engaging pin 44 that is biased into appropriate holes 45 and 46 by means of a torsion spring 47 around a cross pin 48 connecting crank 43 to the cam shaft extension 49.

When cam shaft 42 is rotated 180° downward from the full-lined position of FIG. 1 for counterclockwise input shaft (CCI) to the dotted position for clockwise input rotation (CI), torsion spring 50 biases U frame 31 to keep it always in contact with the top surface of cam shaft 42. The contact is of course also maintained during all translational sliding motions of frame 31 along the axis of cam shaft 42.

The required repositioning of cam 42 with a change in the direction of rotation of the input shaft can be made automatic for applications like electric automobile transmissions by tieing selection lever 43 to the motor reversing lever, either by mechanical connection of flexible shafts or by means of remote electromagnetic actuation.

The stability of the speed changer system for both counterclockwise input (CCI) and clockwise input (CI) can be verified by means of diagrams of vector velocities, as shown in FIG. 5. The vector diagram of 5(a) is that the FIG. 2 for the case of counterclockwise input whose stability was examined in detail previously. When the transmission input shaft is reversed without disengaging pin 30 and slot 29, the closing horizontal velocity vector of FIG. 5(b) shows the loading wheel system moving in an unstable direction away from the initiating command displacement $X_1$. And finally when 29 and 30 are disengaged and 37 and 39 are engaged, the vector velocity diagram of FIG. 5(c) again shows the loading wheel assembly following the command displacement $X_1$ in a stable manner.

While I have illustrated and described a single embodiment of my invention, it will be understood that this is by way of illustration only and that various changes and modifications may be contemplated in my invention and within the scope of the following claims.

I claim:

1. In a frictionally driven, continuously variable speed transmission comprising stacks of interleaved laminations mounted on input and output drive shafts, improved means for squeezing together said interleaved laminations so as to develop interlaminar surface friction forces for torque transmission and for setting and controlling the speed ratio, said means comprising a pair of opposed bearing supported, convex surfaced rollers mounted on roller bearing shafts for applying squeezing forces on opposite ends of said lamination stacks and in a direction parallel to said drive shafts on which squeezing forces are applied to said lamination stacks, frames supporting each roller bearing shaft, swivel shafts on which said frames are rotatable on axes parallel to said drive shafts and perpendicular to said roller bearing shafts and intersecting the centers of contact of the convex surfaces of said rollers with end laminations of said interleaved torque transmitting laminations, thrust bearings acting on the end of said shafts and through which said swivel shafts apply the squeezing forces, loading arms in which said swivel shafts and roller bearing shafts are retained and supported, a roller loading spring and its reaction forces acting on one end of said loading arms while the other end terminates in an axially slideable bearing mounted on a guide rod extending in a direction at right angles to said drive shafts and lying in a plane parallel to the plane in which said drive shafts lie, two link members for additionally trying together said roller swivel shafts, said link members extending over the outer rims of said interleaved laminations and engaging each other on one end in a pivoted joint that forces said swivel shafts to move in unison and in the same angular direction, a control bar on a rotating screw movable in a direction perpendicular to said drive shafts and parallel to the planes of laminations for determining the angular displacement of said swivel shafts and attached link members, a U frame serving as the connection between said link members and control member, said U frame straddling said loading arms and being pivoted on a link at one end and having a pin shaft at the other end that engages a slot in the control member, said slot permitting the link and swivel shaft to swivel as said control member that engages sais pin shaft is rectilinearly displaced by said rotating screw, said slot in said control member permitting said swivel shaft to swivel in the direction of reducing the initial angle of swivel as the roller moves to follow the control member displacement, said swivel angular displacement being so chosen that said roller is caused to follow stable negative exponential approach to the final command position of the control member, said follower response being caused by the friction forces arising between the rollers and contacted laminations as a result of the triangle of vector velocities of (a) the peripheral velocity of the laminations, (b) the peripheral velocity of the swivelled contacting roller, and (c) the translation velocity of the link and roller swivel shaft in the direction of the command displacement of said control member.

2. The transmission recited in claim 1 wherein the forked connection at the pin shaft between said link said swivel being at one end of a link member for counterclockwise rotation of the input shaft, and said fork and pin shaft connection being transferred to the other end of the link for clockwise rotation of the input shaft by means of another forked member pivoted at the diametrically opposite end of the link member and capable of engaging the diametrically opposite end of said command control member together with an eccentric cam shaft that is in contact with the lower fork member for determining the choice of fork engagement for clockwise or anti-clockwise input rotation, a link member for assuring simultaneous engagement of one fork and disengagement of the other fork from the command control member, said tie member connecting the two forks together so that they move in unison as the selector cam shaft is rotated 180° from one position for clockwise transmission input to the other position for counterclockwise transmission input.

3. A transmission for transferring rotary power from an input shaft to an output shaft comprising interleaved stacks of relatively thin flexible laminations keyed to said respective shafts, in combination with opposed loading wheels for squeezing together said laminations at one point, means for swivelling said loading wheels about an axis passing through that point and parallel to the said input-output shaft axes, to cause the said loaded point to be displaced, by rolling as opposed to sliding, said means steering the wheels by changing their angle of inclination to any position along the line perpendicular to said shafts and passing through the shaft centers.

4. A transmission as recited in claim 3 wherein said loading wheels are ball bearing-like wheels having convex outer surfaces which roll with substantially no slip on the outer laminations, swivel frames for mounting said loading wheels, which frames are adapted to be swivelled about support axes, parallel to said input and output shafts, to cause the wheels to run along the laminations in a radial direction on a line normal to and between said input and output shafts of the transmission, a guide rod extending parallel to the desired loading wheel translation displacement paths and loading arms having bushed ends for guiding over said rod for changing the transmission speed ratio.

5. The transmission as recited in claim 3, in combination with a control bar, means for making said loading wheels follow said control bar for both clockwise and counterclockwise input shaft rotations, said last named means including a cam that changes the direction of the swivel angle of said swivel-frames from counterclockwise to clockwise, viewed from the input shaft end, when the input shaft rotation is reversed respectively from counterclockwise to clockwise, and a pivoted U-frame acting in combination with said cam which transfers a connection between said swivel frames and control bar from the lower end to the upper end of said bar and swivel frame.

6. A transmission as recited in claim 5 together with a threaded rod for adjusting the speed of the transmission by causing said control bar to be displaced to a desired speed ratio position , loading arms biased by a spring for yieldingly urging said loading wheels toward said laminations, a rack attached to one end of said loading arms, said rack engaging a pinion that drives an indicating pointer over a speed scale thereby translating the rectilinear rack displacement to a pointer rotation on the speed indicating scale.

7. A transmission as recited in claim 6 together with means for limiting the output inertial acceleration load and thereby for protecting the transmission drive friction surfaces of said laminations from destructive overload slip, said last named means comprising a limited clearance gap between said U-frame and loading arms for limiting the angle of swivel of said swivel frames and thereby limiting the translation velocity of said swivel frames.

* * * * *